United States Patent
Dorin et al.

(10) Patent No.: US 6,599,482 B1
(45) Date of Patent: Jul. 29, 2003

(54) CENTRIFUGE CONTAINER RACK WITH BALANCING FEATURE

(75) Inventors: Melvin Dorin, Mountain View, CA (US); Patrick Q. Moore, Gilroy, CA (US); Winston H. H. Lowe, Sunnyvale, CA (US)

(73) Assignee: Beckman Coulter, Inc., Fullerton, CA (US)

( * ) Notice: Subject to any disclaimer, the term of this patent is extended or adjusted under 35 U.S.C. 154(b) by 0 days.

(21) Appl. No.: 09/365,442

(22) Filed: Aug. 2, 1999

(51) Int. Cl.$^7$ .................................................. G01G 1/24
(52) U.S. Cl. ...................... 422/104; 177/195; 177/200; 220/486; 211/74; 211/85.31
(58) Field of Search ................................ 177/190, 195, 177/200; 220/486; 211/74, 85.31; 422/104; 472/106–114; 366/210

(56) References Cited

U.S. PATENT DOCUMENTS

| | | | | |
|---|---|---|---|---|
| 273,530 | A | * | 3/1883 | Hill |
| 292,254 | A | * | 1/1884 | Rich |
| 447,654 | A | * | 3/1891 | Bew |
| 1,018,173 | A | * | 2/1912 | Dunn |
| 1,470,900 | A | * | 10/1923 | West |
| 1,905,574 | A | * | 4/1933 | Sternberg |
| 2,145,515 | A | | 1/1939 | Kucher |
| 2,325,988 | A | * | 8/1943 | Thomas |
| 2,981,440 | A | * | 4/1961 | Lilja |
| 3,117,780 | A | * | 1/1964 | Gregory |
| 3,167,143 | A | * | 1/1965 | Savage |
| 3,614,155 | A | * | 10/1971 | Campbell et al. |
| 4,135,660 | A | | 1/1979 | Conn et al. |
| 4,139,100 | A | * | 2/1979 | Reed |
| 4,157,781 | A | | 6/1979 | Maruyama |
| 4,671,940 | A | | 6/1987 | Holen et al. ................... 422/72 |
| 4,757,905 | A | * | 7/1988 | Green |
| 4,792,002 | A | | 12/1988 | Ward ........................... 177/200 |
| D324,780 | S | * | 3/1992 | Sebesta |
| D324,793 | S | * | 3/1992 | Johnson |
| 5,150,784 | A | * | 9/1992 | Sayad |
| 5,207,634 | A | | 5/1993 | Greenstein .................... 494/10 |
| 5,376,063 | A | | 12/1994 | Greenstein .................... 494/37 |
| D394,970 | S | * | 6/1998 | Ho |
| 5,769,775 | A | | 6/1998 | Quinlan et al. ............... 494/10 |
| 6,138,840 | A | * | 10/2000 | Seip |
| D446,658 | S | * | 8/2001 | Osborne |

FOREIGN PATENT DOCUMENTS

WO    WP 98/01760    1/1998

OTHER PUBLICATIONS

Merriam–Webster's Collegiate Dictionary, 10$^{th}$ edition, 1999, p. 962.*
Merriam–Webster's Collegiate Dictionary, 10$^{th}$ edition, 1999, pp. 160 and 814.*
Physics for Scientists and Engineers, Fishbane et al., 1993, p. 383.*

* cited by examiner

Primary Examiner—W. L. Walker
Assistant Examiner—David Sorkin
(74) Attorney, Agent, or Firm—David Schneck; William H. May; D. David Hill

(57) ABSTRACT

A centrifuge container transport rack designed with symmetrical opposing sides located over a central pivot. The pivot enables the rack to be utilized in the balancing of centrifuge containers.

7 Claims, 5 Drawing Sheets

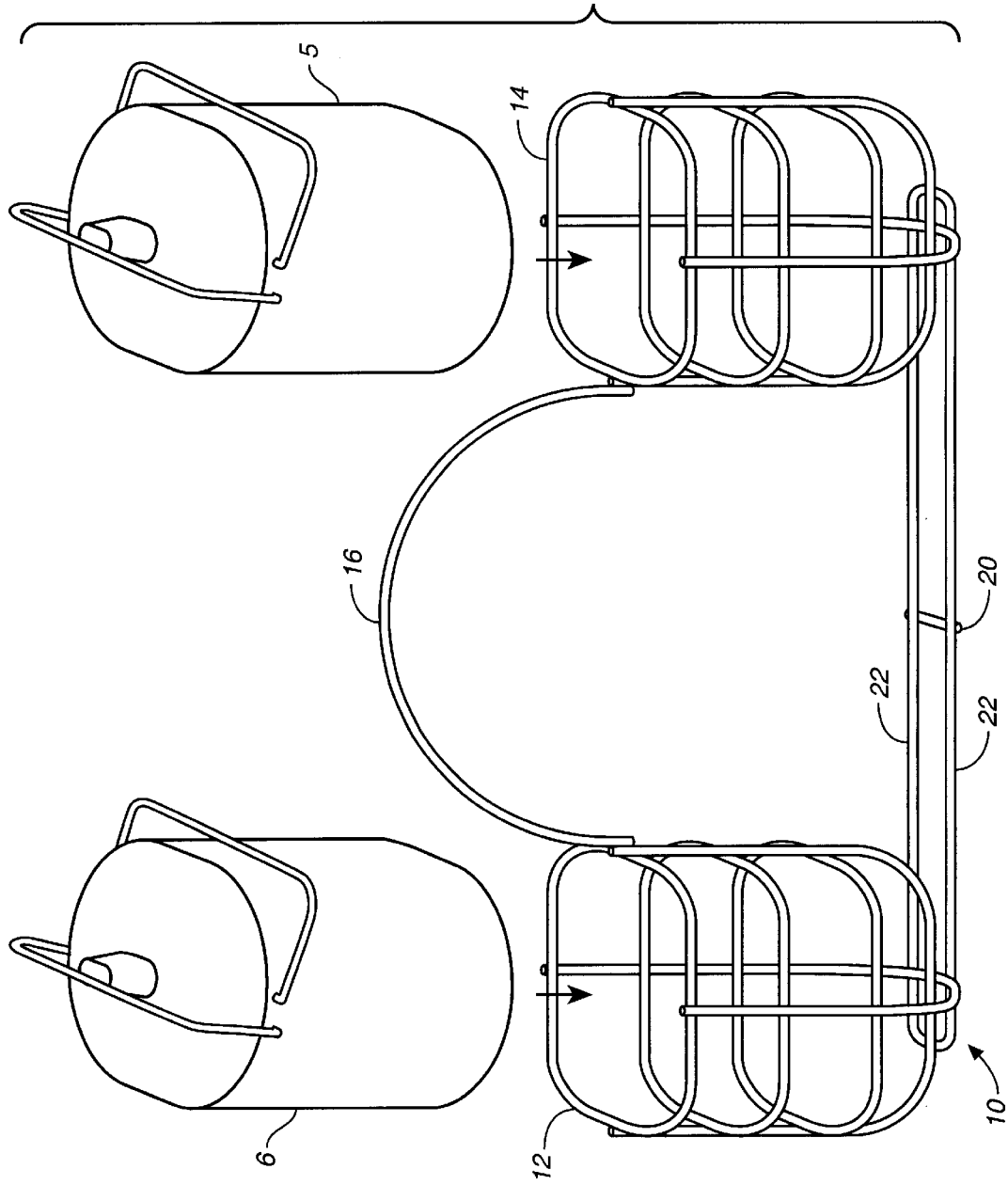

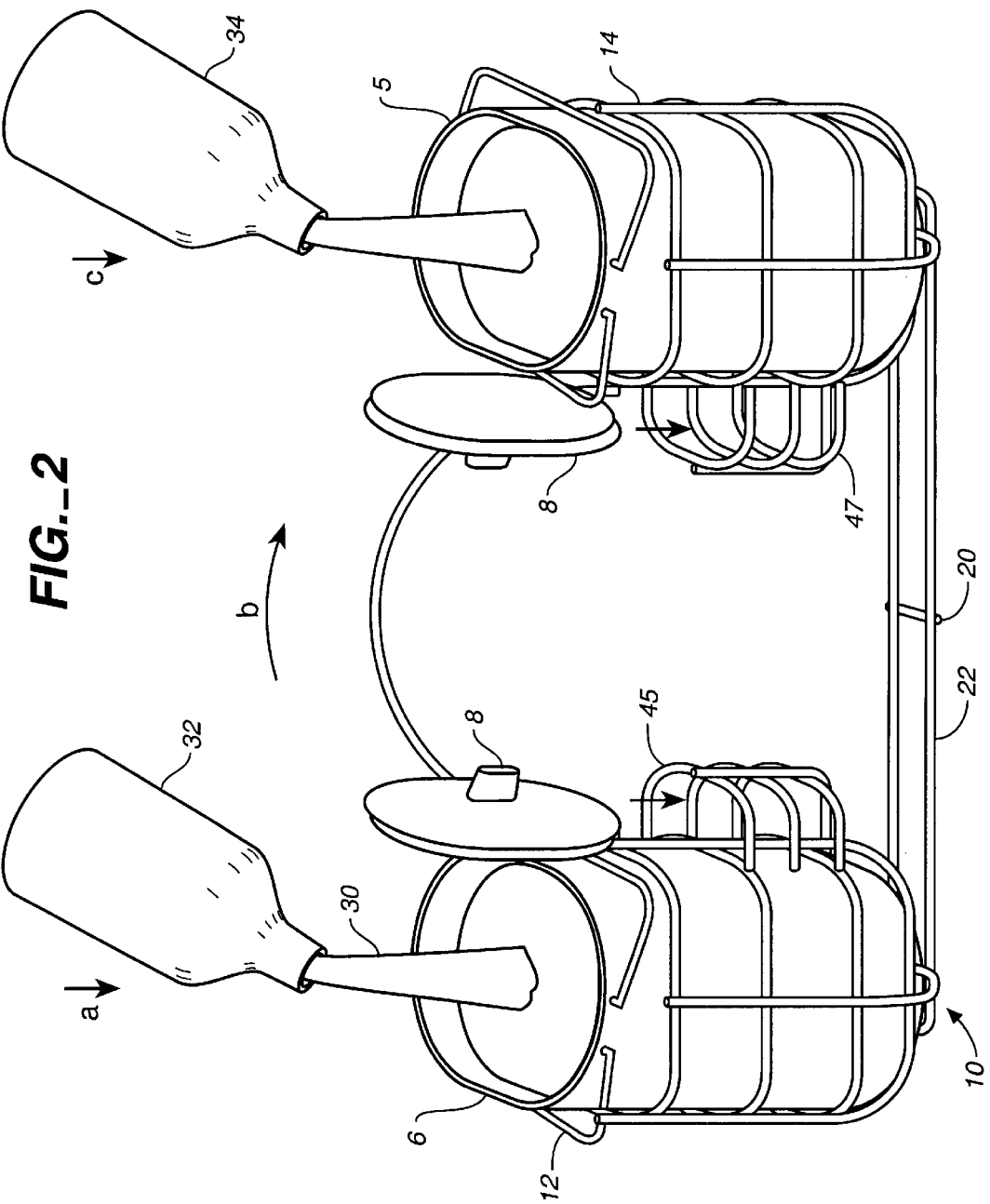

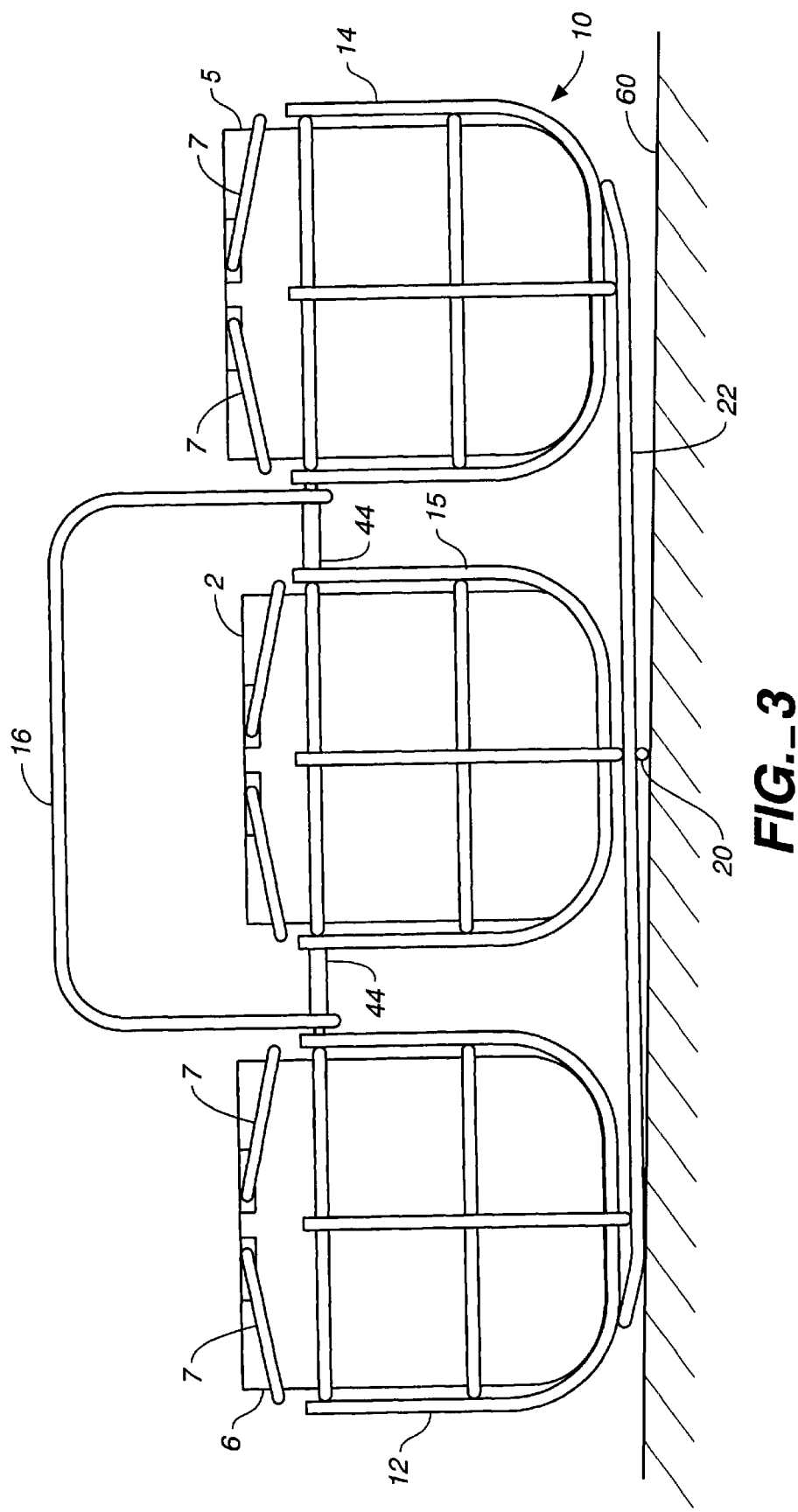
FIG._3

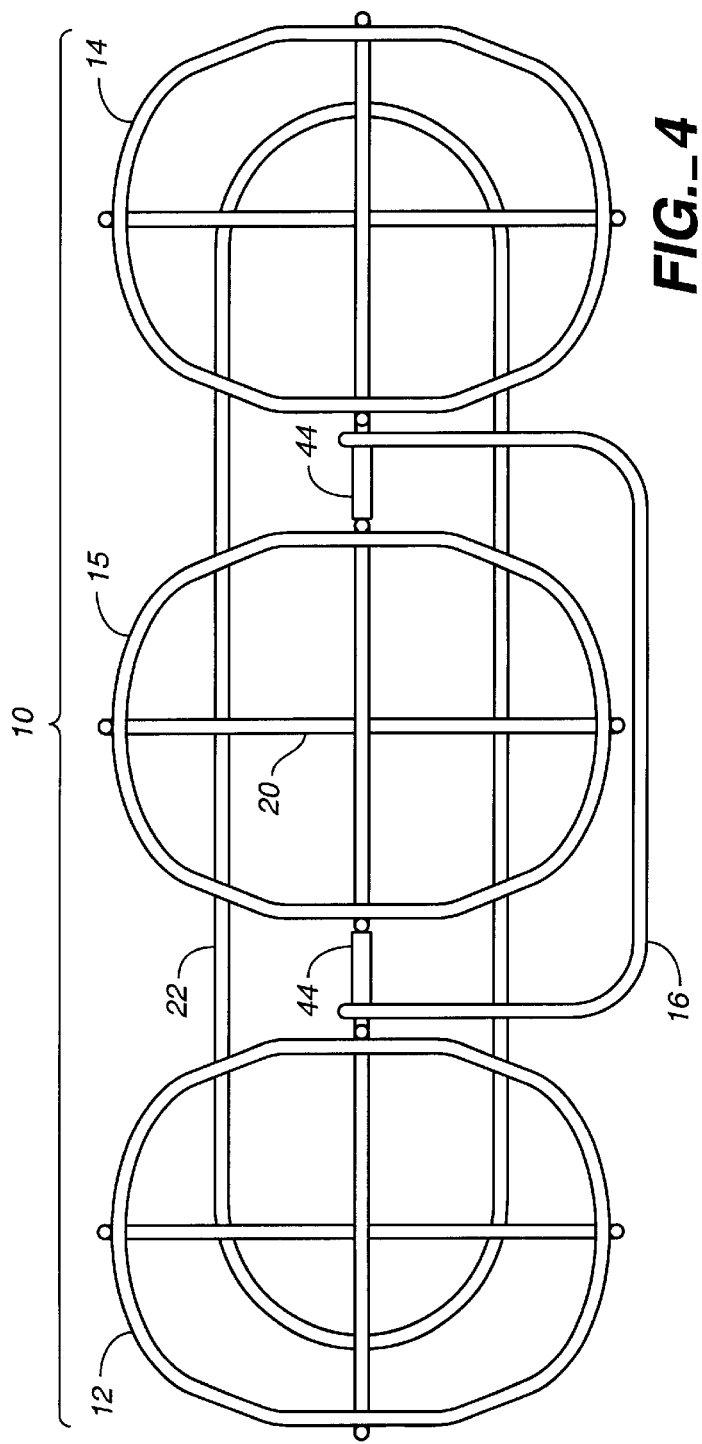
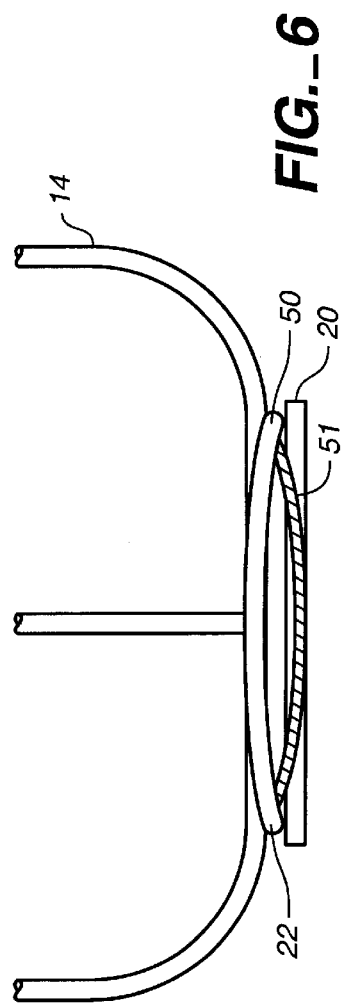

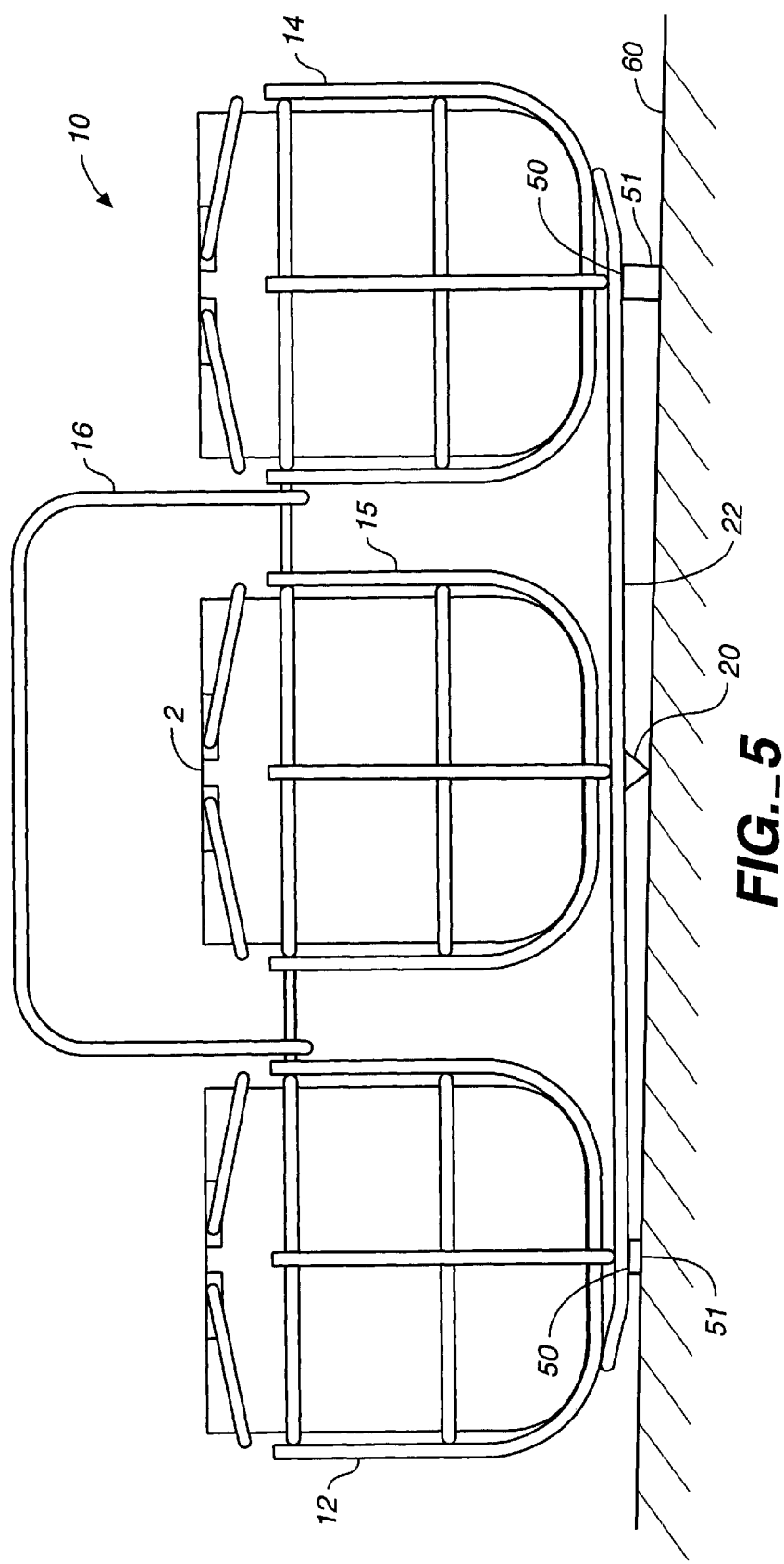

CENTRIFUGE CONTAINER RACK WITH BALANCING FEATURE

TECHNICAL FIELD

The present invention relates to devices for carrying and balancing centrifuge containers.

BACKGROUND ART

Centrifuges are widely used in chemical and biological separation protocols to separate components in liquid samples using centrifugal force. The liquids to be separated are placed into an appropriate container. The container is then placed into a centrifuge rotor which rotates the container at a selected speed.

The weight of containers rotated about an axis must be balanced. Containers of uneven weight create uneven forces as the centrifugal force is applied. This can cause damage to the rotor and/or the container. In addition the separation efficiency degrades under uneven forces. The affect of container imbalance increases with increased rotational speed.

Various fairly complicated and expensive devices have been developed to aid in the balancing of centrifuge containers. For example, U.S. Pat. No. 5,769,775 describes an automated centrifuge which includes a weighing station. The weighing station weighs sample holding racks which are delivered to the weighing station by a robotic arm. The robot arm positions the rack to achieve a balanced arrangement of the rack within a rotor. U.S. Pat. Nos. 5,376,063 and 5,207,634 describe a self-balancing centrifuge apparatus which uses two counter weights. The centrifuge has a plurality of holes for receiving cartridges or other containers. Once the cartridges are loaded into this centrifuge apparatus, the counter weights are moved to a position which will substantially balance the centrifuge. U.S. Pat. No. 4,135,660 describes a pivotal carrier for use with centrifuge rotor. The pivotal carrier contains a plurality of receiving areas for receiving centrifuge containers. The rack can be adjusted to have a balanced weight so that dynamic rotor balance is maintained.

While high precision is required for balancing centrifuge containers under high rotational forces, larger containers spun at slower speeds may tolerate a larger amount of weight difference between containers. Currently centrifuge containers are often balanced through the use of a balance or scale in which containers are weighed and additional liquid is added to opposing containers until the containers are of equal weight and thus in balance when placed on opposing sides within a symmetrical rotor. Such procedure however requires some experimentalist time. In addition the containers then must be loaded into a rack, basket, tray or other transport means and transported to a centrifuge. As an alternative method to balance centrifuge containers some experimentalists simply "eyeball" the level of liquid within containers. This practice of visually determining when the liquid level within two containers is equal, is rapid, but prone to error. As container diameter gets larger the error gets larger. The error resulting from improperly balanced containers can cause damage to centrifuge containers and/or rotors as well as detract from centrifuge separation efficiency.

It is the object of the invention to provide a centrifuge labware rack which can also be employed in balancing the opposing weights of centrifuge containers. Such a rack should be durable, simple and inexpensive to manufacture, adaptable to sterilization and easy to use.

It is a further object of the invention to provide a rack that will expedite the loading and balancing of large capacity (typically greater than 1 liter) centrifuge containers used in high capacity centrifuge rotors.

SUMMARY OF THE INVENTION

The above objects have been achieved with a centrifuge labware rack for use in balancing centrifuge containers. The labware rack contains two cages positioned on opposite ends of a rigid beam. Centrally located on the beam is a pivot. In using this rack liquid can be poured into a first container contained within a first of the cages on the balance rack. A second container can be put into the second cage and filled with liquid. When the two containers are of approximate balanced weight the rack will begin to tip on the pivot.

The rack has symmetrical weight on either side of the pivot. The rack has a handle for carrying the containers. The rack may also have side cages or trays for holding the lids of centrifuge containers as the centrifuge container is filled with liquid. A spring clip may be added to the ends of the rack to negate the mass of the rack and aid in balancing the containers.

BRIEF DESCRIPTION OF THE DRAWINGS

FIG. 1 shows a centrifuge labware rack of the present invention.

FIG. 2 shows the centrifuge labware rack of FIG. 1 containing two centrifuge containers which are being filled with liquid.

FIG. 3 shows a side view of an alternate embodiment to the rack of FIG. 1.

FIG. 4 shows a top view of the rack of FIG. 3.

FIG. 5 shows a side view of a second alternate embodiment to the rack of FIG. 1.

FIG. 6 shows a detail of the end view of the rack of FIG. 5.

BEST MODE FOR CARRYING OUT THE INVENTION

In a typical centrifuge, centrifuge containers are mounted into or onto a rotor. The rotor then rotates, applying centrifugal force to the contents of the containers. In many rotors the load is in opposing orientation, that is, the rotor receives containers such that containers of equal size and weight are spun at an equal radius and angular orientation from the rotor center and the containers are positioned on opposing sides of the rotor. In this "mirror image" orientation, a set of two containers must be of balanced weight to prevent rotor imbalance. An unbalanced rotor may damage the rotor and centrifuge, may damage the centrifuge container, will result in lower separation efficiency, and potentially could injure the experimentalist. The container weight imbalance tolerated is partially a function of the g-forces applied by the centrifuge. Higher spin RPM and larger rotor radii result in higher g-forces. However, even for large rotational radii and slow spin speeds, containers in opposing orientation should be balanced.

With reference to FIG. 1, centrifuge labware rack 10 is shown. On centrifuge labware rack 10 are container cages 12, 14. Extending between container cages 12, 14 is handle 16 allowing easy transport of the rack. The bottom of container cages 12, 14 are secured to opposing ends of rigid beam 22. Beam 22 is a wire loop made of heavy gauge wire (sufficient to resist flexure), preferably made of stainless steel. Centrally located on the opposite side of rigid beam 22 is pivot 20, also made of wire or similar material which can form a line contact or knife edge. Container cages 12, 14 have one open end of sufficient size to receive and hold centrifuge containers 6, 5 respectively. The cages are also made of stainless steel wire having a smaller gauge than the balance beam. The cages and handle are as light as possible, yet rigid enough to support but not flex under container loads.

FIG. 2 illustrates the centrifuge labware rack 10 as the respective centrifuge containers are filled with liquid. Container 6 contained in container cage 12 is filled with liquid 30 from container 32. With centrifuge container 26 full of liquid, beam 22 will tip as indicated by arrow A.

Subsequently centrifuge container 5 contained in container cage 14 is filled with liquid 31 from supply bottle 34. When the containers come into approximate balanced weight the balance beam 22 will begin to pivot upon pivot 20. This results in movement of centrifuge labware rack as indicated in arrows B, C. Once the centrifuge labware rack begins to tip into the direction indicated by arrows B, C liquid should no longer be poured from supply bottle 34.

Centrifuge containers 6, 5 may have lids 8. These lids may be accommodated on the centrifuge bottle rack on side-car cage 45, 47 respectively. In this manner the lids may be included in the centrifuge bottle rack and are balanced along with the containers.

With reference to FIG. 3 an alternative embodiment of centrifuge bottle rack 10 is shown. As in FIG. 1 container cages 12, 14 are positioned on opposite ends of balance beam 22 with cage 12 tipped down to rest on flat surface 60. Centrally located on the underside of beam 22 is pivot 20. Centrifuge containers 5, 6 are inserted into container cages 14, 12 respectively. Centrifuge containers 2, 5, and 6 have container handles 7 which may be used to secure the container lids onto the container once the container is filled. When the containers are to be balanced the lids are removed from the containers. In this embodiment, handle 16 is mounted on support pin 44. Handle 16 may be mounted such that it may freely rotate on support pin 44, allowing the handle to be moved to other side. Central cage 15 is included centrally disposed above pivot 20. Support pin 44 extends from central cage 15 to cages 12, 14 on other side. Central cage 15 may hold a third piece of labware 2 or similar container.

In balancing containers, one container may be used as a primary mass. The other containers would be balanced against this primary mass so that all containers are of substantially equal weight. Center cage 15 may be used to carry the additional balanced containers. In a six place rotor, the center cage on two racks may carry the 5th and 6th mass-balanced centrifuge containers.

FIG. 4 illustrates a top view of the rack shown in FIG. 3 without labware. Central cage 15 is disposed such that it is symmetrically attached over pivot 20. Container cages 12, 14 are symmetrically disposed on beam 22. This symmetrical orientation ensures that the rack will tip based on the weights of the containers inserted into the rack and not as an artifact of the rack's weight. Handle 16 is shown rotated to one side on support pins 44.

Another alternative embodiment shown in FIG. 5 utilizes an additional element-to negate the center-of-gravity ($c_g$) shift that has to be overcome to allow the rack to tip when the proper mass balance is achieved. As shown in FIG. 5 the rack again has a rigid beam 22 with two symmetrically disposed side cages 12, 14 with a handle 16 extending between the two side cages. Centrally located on beam 22 is pivot 20. Central cage 15 containing a third piece of labware is centrally positioned over pivot 20. The weight of the rack is symmetrically disposed about pivot 20. The rack is shown resting on surface 60 with cage 12 tipped down.

In this embodiment, small spring clips 51 are attached at position 50 on balance beam 22. These spring clips 51 would hold the empty rack in balance. Any additional weight added to rack 10 (either containers or containers with sample liquid added) would offset rack 10 to tip to one side as shown in FIG. 5. The spring force for each of spring clip 51 is equal to one-half the mass of rack 10. The combination of the two spring forces negates the mass of rack 10, and eases the tip-over force.

FIG. 6 presents an alternative view of the embodiment shown in FIG. 5. As shown, spring clips 51 extend across beam 22. Spring clip 51 is attached at location 50 on beam 22. The location of spring clip 51 is approximately over the center of container cage 14.

The centrifuge labware rack may be manufactured of stainless wire (or suitable equivalent). This makes the rack corrosion-resistant, durable, and adaptable to autoclave or chemical sterilization. By altering the size (smaller) and shape of pivot 20 (which more closely approximates a knife edge) allows greater sensitivity of the balancing feature of the present device. This rack aids in hands-free loading of samples, serves as a carrying rack for centrifuge container, and may be used in sterilization of labware assemblies. The rack may be sterilized by autoclave sterilization along with centrifuge containers.

The rack is designed so that the rack is symmetrical on either side of the pivot. The rack is constructed to be symmetrical such that it adds negligible contribution to the total rack imbalance.

The container cages are constructed of two to three horizontal wire loops with two perpendicular U-shaped support structures. The container cages are constructed to provide sufficient rigidity of construction to support the container weight transported. Preferably the rack should be as light as possible. This may be achieved by manufacture of the rack of injection molded plastic. The plastic used should be durable and adaptable to autoclave sterilization.

The rack elements are selected to balance sufficiently for rotor tolerance at a specified g-force range. The pivot may be a round wire, an oval wire, or a pointed fulcrum. The shape of the pivot is selected to allow for better balance. The container cages should be matched to the containers so that container position within the container cage does not affect the balance of the rack.

The rack functions as a balancing device, a carrier, and a support for sterilization and washing. The rack enables gravity balancing of labware to a designed tolerance. The tolerance is determined by rotor specifications and centrifugal forces applied. The rack allows balancing of containers without added need to use mechanical or electronic balancing systems. The only requirement is a flat surface. Without weighing, an experimentalist may reproducibly balance opposing containers within the imbalance tolerance of the rotor. The rack is autoclavable and thus easily cleaned and sterilized with other labware.

What is claimed is:

1. A centrifuge labware rack comprising:
    a beam;
    a pair of container cages disposed on opposing sides of said beam, said container cages having an open top end and a closed bottom end, said closed bottom end affixed to said beam; and
    a balance means, said balance means below all other elements of said rack.

2. The rack of claim 1 further comprising a handle mounted on said rack.

3. The rack of claim 2 wherein said handle extends between said container cages.

4. The rack of claim 2 wherein said handle is rotatably movable.

5. The rack of claim 1 further comprising, a first lid holder attached to a first container cage and a second lid holder attached to a second container cage said lid holders disposed symmetrically.

6. A centrifuge labware rack comprising:

a beam;

a pair of spaced cages disposed on opposing sides of said beam, said cages each having an open top end and a closed bottom end, said closed bottom end affixed to said beam;

a rack handle extending between said cages;

a balance means; and a pair of spring clips affixed to opposing ends of said beam wherein said clips have sufficient spring force to substantially negate the center-of-gravity shift as mass is balanced with said rack.

7. The rack of claim 6 wherein a spring force of each of said pair of spring clips is equal to one-half-of a weight of said rack.

* * * * *